(12) United States Patent
Milford

(10) Patent No.: US 11,418,828 B2
(45) Date of Patent: *Aug. 16, 2022

(54) CONTROLLER FOR ESTABLISHING PERSONALIZED VIDEO CHANNELS

(71) Applicant: ARRIS Enterprises LLC, Suwanee, GA (US)

(72) Inventor: Matthew A. Milford, Waxhaw, NC (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/214,492

(22) Filed: Mar. 26, 2021

(65) Prior Publication Data
US 2021/0219009 A1  Jul. 15, 2021

Related U.S. Application Data

(63) Continuation of application No. 16/396,642, filed on Apr. 27, 2019, now Pat. No. 10,965,977.

(60) Provisional application No. 62/665,821, filed on May 2, 2018.

(51) Int. Cl.
| | |
|---|---|
| H04N 21/2668 | (2011.01) |
| H04N 21/234 | (2011.01) |
| H04N 21/433 | (2011.01) |
| H04N 21/258 | (2011.01) |
| H04N 21/262 | (2011.01) |
| H04N 21/81 | (2011.01) |
| H04N 21/2381 | (2011.01) |
| H04N 21/2665 | (2011.01) |

(52) U.S. Cl.
CPC ..... *H04N 21/2668* (2013.01); *H04N 21/2381* (2013.01); *H04N 21/23424* (2013.01); *H04N 21/25891* (2013.01); *H04N 21/2665* (2013.01); *H04N 21/26258* (2013.01); *H04N 21/4334* (2013.01); *H04N 21/812* (2013.01)

(58) Field of Classification Search
None
See application file for complete search history.

(56) References Cited

U.S. PATENT DOCUMENTS

| | | |
|---|---|---|
| 9,774,914 B2 | 9/2017 | Riegel et al. |
| 10,129,593 B2 | 11/2018 | Badawiyeh |
| 2009/0133059 A1 | 5/2009 | Gibbs |
| 2010/0031288 A1 | 2/2010 | Scott et al. |
| 2010/0158109 A1 | 6/2010 | Dahlby |
| 2011/0225417 A1 | 9/2011 | Maharajh et al. |
| 2012/0137337 A1 | 5/2012 | Sigmon, Jr. |
| 2016/0142783 A1 | 5/2016 | Bagga et al. |

(Continued)

OTHER PUBLICATIONS

Canadian Office Action Re: Application No. 3,041,758.

*Primary Examiner* — James R Marandi
(74) *Attorney, Agent, or Firm* — Chernoff, Vilhauer, McClung & Stenzel, LLP

(57) ABSTRACT

A method provides content decisions for a personalized channel that is to be deliverable to a prescribed set of client devices as a linear channel streaming adaptive bit rate (ABR) video. In the method, a request is received for a content asset to be inserted in a linear video stream at a specified time. The linear video stream is to be presented on the personalized channel. Responsive to the request, a network location is provided for accessing a specified content asset to be inserted in the linear video stream at the specified time.

20 Claims, 8 Drawing Sheets

(56) References Cited

U.S. PATENT DOCUMENTS

| | | |
|---|---|---|
| 2016/0307596 A1 | 10/2016 | Hardin et al. |
| 2017/0055039 A1 | 2/2017 | Earle |
| 2017/0289597 A1 | 10/2017 | Riedel et al. |
| 2017/0374121 A1 | 12/2017 | Phillips et al. |

PERSONAL PROFILE SELECTIONS

PROFILE 1 - PARENT

WOULD YOU LIKE A LOCAL STREAM OF NEWS, WEATHER, SPORTS? Y/N

WOULD YOU LIKE A VIDEO STREAMS BY GENRE OF MOVIE, TV SHOW? Y/N

WOULD YOU LIKE TO FOLLOW SPECIFIC SPORTS TEAMS? Y/N

*FIG. 3*

MOVIE/TV GENRES

| DRAMA | ☐ |
| COMEDY | ☑ |
| SCI-FI | ☐ |
| ACTION | ☑ |

*FIG. 4*

CONTROLLER FOR ESTABLISHING PERSONALIZED VIDEO CHANNELS

CROSS REFERENCE TO RELATED APPLICATION

This Application is a continuation of U.S. patent application Ser. No. 16/396,642 filed on Apr. 27, 2019, which claims priority under 35 U.S.C. § 119(e) from earlier filed U.S. Provisional Application Ser. No. 62/665,821, filed May 2, 2018, each which are incorporated herein by reference in its their entirety.

BACKGROUND

Subscription based video content service providers employ networks such as direct broadcast satellite (DBS), over-the-air, cable or telecommunication distribution systems to distribute video content as linear video or video-on-demand (VOD) streams. Recently, these video content providers have overlaid adaptive bitrate (ABR) systems to satisfy their subscribers' demands for IP-based over-the-top services as well as linear video or video-on-demand (VOD) streams.

Consumers of linear and VOD content have an ever-growing number of content sources available to them, and they want to receive that content easily on a wide variety of devices. For instance, service providers often provide hundreds of different channels for viewers to choose from. Additionally, a vast array of Internet-based sources of content are also available to consumers, including video, still images and graphics. To assist consumers in selecting and receiving the video content that they are most interested in, subscription-based video content service providers would like to offer personalized channels targeted or personalized for individual consumers or groups of consumers that have one or more attributes or characteristics in common. For instance, personalized channels may be targeted to groups of consumers who are physically located in common regional markets.

BRIEF DESCRIPTION OF THE DRAWINGS

FIGS. 3-7 show examples of prompts that may be presented to allow a user to establish personalized channels.

DETAILED DESCRIPTION

Figure 1:
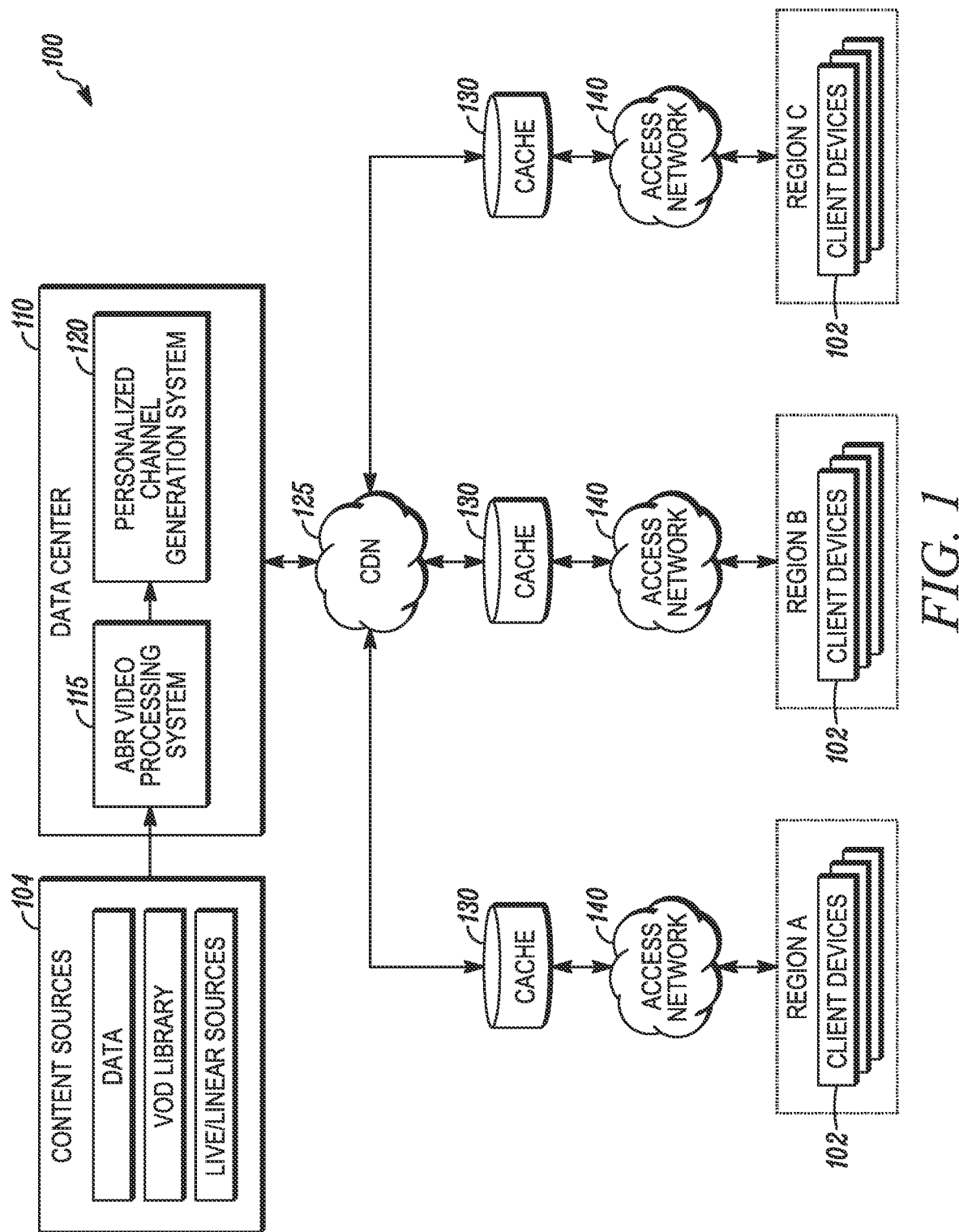
FIG. 1 shows one example of an operating environment in which the techniques, systems and devices described herein may operate.

As explained in more detail below, the present disclosure generally relates to providing personalized video content and personalized advertisements to client devices. Each client device may have one or more personalized channels that can be provided in addition to or instead of a set of standard channels. For example, suppose the client device is a television or a set top box. The television or the set top box has a set of standard channels, e.g., CNN, ABC, NBC, CBS, etc., for traditional television programs. In addition, the television or set top box may also have a set of personalized channels tailored to individual users of the client device or a demographic group of users (e.g., users residing in a common geographic area, users interested in similar content such as sports or certain genres of movies). Thus, while these users within the same locale may have a similar set of available standard channels, the personalized channels may vary from user to user or from a demographic group of users to another demographic group of users. The personalized channels may contain a combination of video content selected by the individual users and video content recommended by the system for the individual users or groups of users.

In one implementation, the personalized channels may be delivered to consumers as adaptive bitrate (ABR) streams. The ABR streams may be obtained using VOD manifest files that function as live manifest files, but which are able to provide the consumer with VOD content as well as linear content. In this way the consumer is able to experience a customized selection of VOD content as live content just as if it were available on conventional channels.

Adaptive bit rate streaming is a technique for streaming multimedia where the source content is encoded at multiple bit rates. It is based on a series of short progressive content files applicable to the delivery of both live and on demand content. Adaptive bit rate streaming works by breaking the overall media stream into a sequence of small file downloads, each download loading one short segment, or chunk, of an overall potentially unbounded content stream.

As used herein, a chunk is a small file containing a short video segment (typically 2 to 10 seconds but can be as short as a single frame in some implementations) along with associated audio and other data. Sometimes, the associated audio and other data are in their own small files, separate from the video files and requested and processed by the ABR client(s) where they are reassembled into a rendition of the original content. Adaptive streaming may use, for instance, the Hypertext Transfer Protocol (HTTP) as the transport protocol for these video chunks. For example, 'chunks' or ' chunk files' may be short sections of media retrieved in an HTTP request by an ABR client. In some cases these chunks may be standalone files, or may be sections (i.e. byte ranges) of one much larger file. For simplicity the term 'chunk' is used to refer to both of these cases (many small files or fewer large files).

Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

FIG. 1 shows one example of an operating environment in which the techniques, systems and devices described herein may operate. In particular, FIG. 1 depicts a high-level functional block diagram of a representative adaptive bit rate system 100 that delivers content to adaptive bit rate client devices 102. An adaptive bit rate client device 102 is a client device capable of providing streaming playback by requesting an appropriate series of segments from an adaptive bit rate system. The ABR client devices 102 associated with users or subscribers may include a wide range of devices, including, without limitation, digital televisions, set top boxes (STBs), digital media players, mobile communication devices (e.g., smartphones) video gaming devices, video game consoles, video teleconferencing devices, and the like.

The content made available to the adaptive bit rate system 100 may originate from various content sources represented by content source 104, which may provide content such as live or linear content, VOD content and Internet-based or over-the-top (OTT) content such as data, images, video, graphics, text and the like. The content is provided to a data center 110 that includes an ABR video processing system 115 and a personalized channel delivery system 120. ABR video processing system 115 is responsible for ingesting the content in its native format (e.g., MPEG, HTML5, JPEG, etc.) and processing it as necessary so that it can be transcoded and packaged. The ABR video processing system 115 also includes the transcoders and packagers that are responsible for preparing individual adaptive bit rate streams. A transcoder/packager is designed to encode, then fragment the media files into chunks or segments and to encapsulate those files in a container expected by the particular type of adaptive bit rate client. The adaptive bit rate segments are available at different bit rates, where the segment boundaries are aligned across the different bit rates so that clients can switch between bit rates seamlessly at the segment boundaries.

Along with the delivery of media, the packagers create the manifest files for each type of adaptive bit rate streaming protocol that is employed. In adaptive bit rate protocols, the manifest files generated may include a main or variant manifest and a profile or playlist manifest. The main manifest describes the various formats (resolution, bit rate, codec, etc.) that are available for a given asset or content stream. For each format, a corresponding profile manifest may be provided. The profile manifest identifies the media file chunks/segments that are available to the client. The ABR client determines which format the client desires, as listed in the main manifest, finds the corresponding profile manifest and location, and then retrieves media segments referenced in the profile manifest.

The individual adaptive bit rate streams are typically posted to an HTTP origin server (not shown) or the like so that they can be accessed by the client devices 102 over a suitable content delivery network (CDN) 125, which may be in communication with various edge caches 130. In some cases the edge caches 130 are in turn in communication with one or more client devices 102 in one or more regions through one or more access networks 140 that each serve a designated region. By way of a non-limiting example, FIG. 1 depicts an example of the data center 110 in communication with three regions A, B and C. However, the central data center 110 can be in communication with any desired number of regions. CDN 125 and access networks 140 may comprise any suitable network or combination of networks including, without limitation, IP networks, hybrid fiber-coax (HFC) networks, and the like.

It should be noted that the various systems and components of the adaptive bit rate system 100 shown in FIG. 1 may be in any suitable location or locations. To the extent they are not co-located, they may communicate over one or more networks such as an IP CDN.

The various manifests that have been generated by the ABR video processing system 115 are provided to personalized channel generation system 120, which creates the personalized channels based on such factors as individual profiles of subscribers' interests, preferences and specific content selections, subscriber geographical locations, and/or genres of content. For instance, by way of example, personalized channels may be created for all subscribers in particular cities or other market regions, other personalized channels may be created for individual subscribers, and yet other personalized channels may be created for subscribers who, by way of example, are fans of certain genres (e.g., science fiction, westerns) of movies or who are located in a particular region and are interested in local sports events occurring that region.

The personalized channel generation system 120 selects the content assets and events that are to be included in the video stream for each personalized channel and obtains, for each content asset and event, its corresponding manifest. The personalized channel generation system 120 then assembles the manifest for each channel into a rolling manifest that can be delivered to the ABR client device(s) that are to receive that personalized channel.

Figure 2:
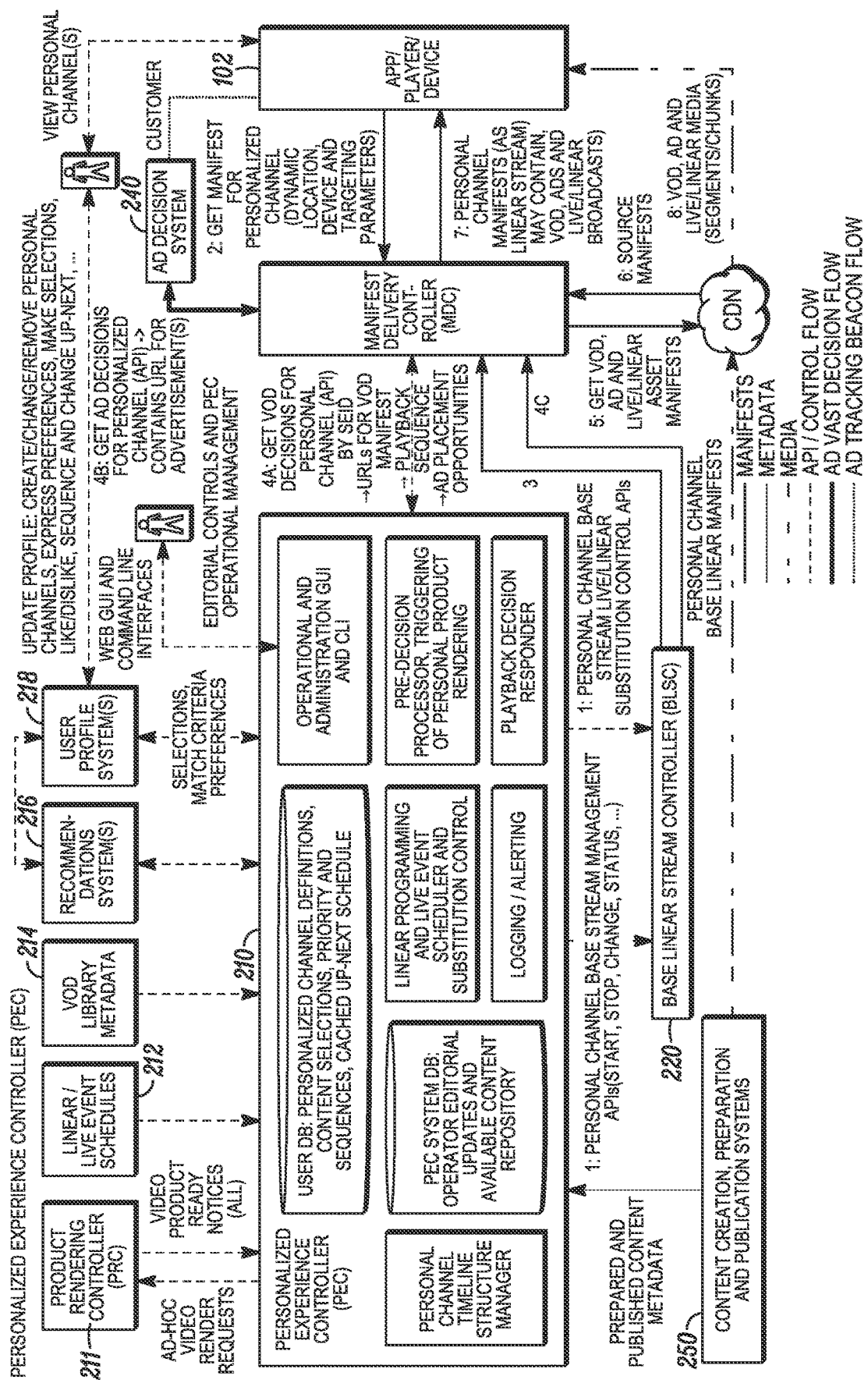
FIG. 2 shows one example of the personalized channel generation system shown in FIG. 1.

FIG. 2 shows one example of the personalized channel generation system 120. The personalized channel generation system 120 includes a personalized experience controller (PEC) 210, a base linear stream creator (BLSC) 220, a video manifest manipulator, referred to herein as manifest delivery controller (MDC) 230, an ad decision system 240 and a database 250. The PEC 210 serves as a decisioning engine that is responsible for selecting the content assets and live events that are to be included in the video stream for each personalized channel. The BLSC 220 is responsible for generating a manifest for each base linear stream. The base linear stream serves as a template for each video stream provided by each personalized channel.

The PEC 210 enables the creation, updating, and removal of the personalized channels. Personalized channels can be defined, by way of example, for individual Multichannel Video Programming Distributors (MVPDs), geographic areas, demographic groups, and/or specific customer/subscribers. The PEC operator can editorially define the structure of the personalized channels and establish priorities concerning particular video content that will be shown to some or all users. This structure may specify, for example, live/linear program play times, times at which advertisements should be inserted, times at which VOD content should be inserted, and so on.

The PEC 210 identifies and selects content that is available from a wide variety of different sources and which may be incorporated into the personalized channels. This can be accomplished by obtaining metadata for the available content. The metadata may be obtained in many different ways. For instance, as indicated in FIG. 2, the PEC 210 can ingest Live/Linear programming schedules 212 and map the available content to the user's subscriptions for inclusion into their personalized channel. The PEC 210 can also ingest metadata 214 for content assets from VOD rendering pools that are used to generate VOD assets from web-based and other online content, VOD workflow systems that generate VOD assets from live/linear content, live/linear scheduling systems and video library systems. For instance, cable companies supply program guides that contain program descriptions or information, and the appropriate attribute data or keywords from these program guides may be extracted. There are many databases available that have information regarding individual pieces of video content.

The content information may be downloaded from the appropriate databases, such as databases of movie and television studios, publishers, online merchants, aggregators (e.g., Gracenote, Tivo), etc.

The PEC 210 also enables the end user to select content, define criteria, express preferences, likes/dislikes and change the priority and sequencing of content assets that are to be delivered on their personalized channel(s). A user profile system 218 may construct profile(s) for the user(s) of the client device 102. Information regarding the users may be obtained from a variety of different sources. For example, a user may input his or her information, such as demographical information, e.g., age, gender, education level, geographical location, etc., or preferences, directly into the client device 102 via an appropriate user interface. In addition or alternatively, user preferences may be automatically determined based on the types of video content that have been previously presented on the client device, and more specifically from the device usage information monitored and collected. If a user often watches videos relating to basketball games, for example, it may be an indication that the user likes sports and sports-related video content. Such information may be used to automatically determine user preferences. In some cases the PEC 210 may use the user profiles and possibly other information to obtain recommendations for content from one or more recommendation systems 216, which are well-known systems that use a variety of different techniques for matching users to content that may be of interest to them. For instance, in one particular case the PEC 210 may query the recommendation system 216 when it needs content to fill one or more particular time slots that do not otherwise have content specified for them.

FIGS. 3-7 show illustrative examples of on-screen prompts that allow users to create one or more personal profiles for establishing personalized channels. The manner in which the user interacts with the user interface will depend in part on the nature of the client device. For instance, users may make selections and provide the requested information using a touch-screen display, remote control unit, a pointer device such as a mouse, and so on. The personal profiles may be obtained directly by the PEC 210 itself and stored in the user profile system 218 or, alternatively, the user profile system 218 may acquire the information from the users and make the resulting profiles accessible to the PEC 210 when selecting content for inclusion in the personalized channels.

Figure 5:
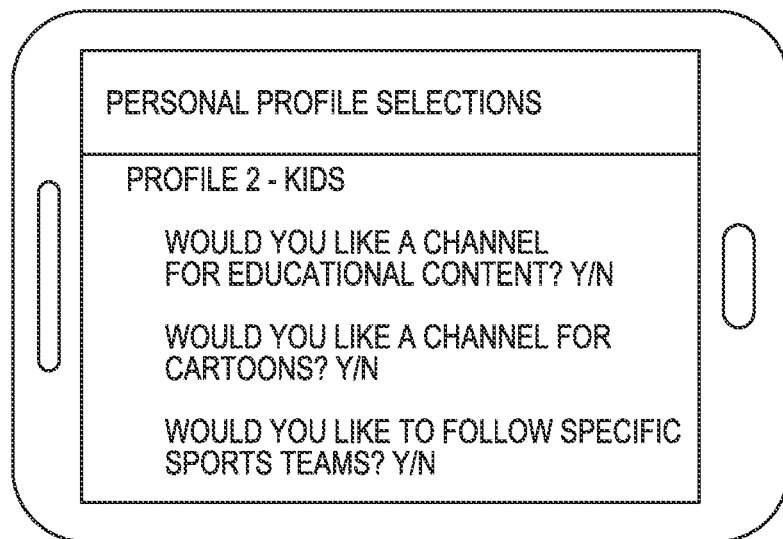
Figure 6:
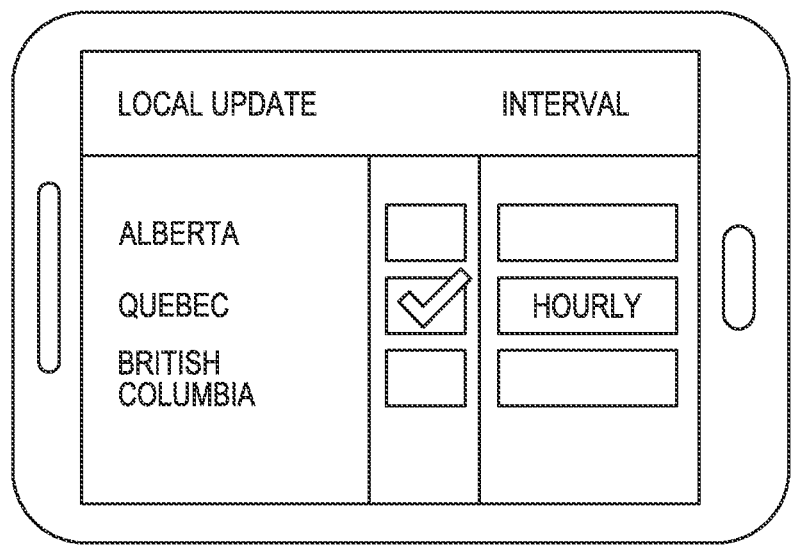
Figure 7:
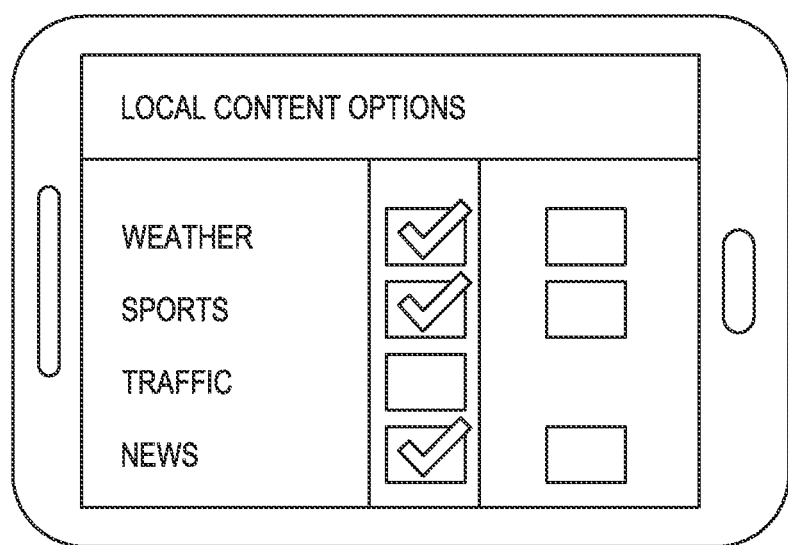

FIG. 3 shows a series of prompts that may be presented to allow a parent or other adult to establish a personalized channel. The prompts may include questions querying, for instance, if the user would like a personalized channel that includes video streams with news, weather and sports content, video streams with certain genres of movies or television shows or specific sports teams. If the user is interested in movies or television shows, for example, then FIG. 4 may be presented, which allows the user to select the genres of content they are interested in. FIG. 5 shows a series of prompts that may be presented to allow a personalized channel to be established on behalf of children. The prompts may include questions querying, for instance, whether educational content and/or cartoons should be included. Yet another sequence of prompts shown in FIGS. 6 and 7 query whether a personalized channel should include local updates (e.g., weather, sports, news, traffic) for specified geographic regions and, if so, the intervals at which such updates should be presented.

Once users have specified the type of content they are interested in viewing on their personalized channels, the user may select specific content by navigating conventional VOD content catalogues, electronic program guides (EPGs) and the like. The users also may be provided with additional prompts or the like to configure the time(s) at which the content should be presented and the frequency at which it should be presented on their personalized channels. For content that regularly updates, such as news, sports weather and traffic, the user may specify when and how often the content should be updated. For instance, a user may specify that traffic and weather updates should be presented at 7 am Monday through Friday.

Based in part on the information obtained directly from individual users as described above, or, if the personalized channel is designated for more than one user belonging to a certain demographic category, the PEC 210 may select the appropriate content to be presented on the personalized channel. Likewise, this same information may be used to provide advertisement targeting parameters to the ad decision system 240 so that it may select advertisements that may be of particular interest to the users who view the personalized channel.

Once personalized channels with the appropriate content have been established, the PEC 210 can generate and make available a personalized timeline of programming (e.g., an electronic program guide) for each channel, which can be accessed for viewing and editing by the end user.

The PEC 210 may also interact with the product rendering controller (PRC) 211, which in some cases is a part of the ABR processing system 115 shown in FIG. 1. The PRC 211 is generally responsible for managing the overall process of creating VOD assets or products from content assets that are obtained from a wide variety of different content sources and which are in a wide variety of different native media formats. Additional details concerning one example of the PRC 211 may be found in U.S. application Ser. No. 16/396,641, which is hereby incorporated by reference in its entirety. Among other things, the PEC 210 may initiate requests to the PRC 211 for creating incidental content that may be needed such as personalized introductory segments to other content assets and live events, interstitial content and information updates if an expected content asset is not available. The PEC 210 may also interact with other systems and components of the ABR processing system 115 shown in FIG. 1, as represented by the content creation, preparation and publications systems 250 shown in FIG. 2.

The PEC 210 also provides a base linear stream creator (BLSC) 220 with a list of available VOD asset, live events and advertisements that have been scheduled for insertion into the video stream. The BLSC 220 is largely responsible for generating base linear stream manifests and serving them to the MDC 230 when requested. The BLSC 220 also will poll the PEC 210 on a regular basis to refresh the list of assets and events that have been scheduled for insertion into the video stream.

The interactions between the PEC 210, the BLSC 220, as well as the MDC 230 will be further explained below.

As explained in more detail below, the base linear stream manifest produced by the BLSC 220 includes a series of content replacement markers that serve as decision points at which different content assets can be inserted for different personalized channels. The content to be inserted is selected by one or more decisioning engines. Interspersed among the content replacement markers may be other markers, such as those defining times as which live content is to be presented and times at which advertisements are to be inserted. The MDC 230 obtains the base linear stream manifests for the personalized channels from the BLSC 220 and requests from an appropriate decisioning engine, which may be the PEC 210 itself, an ad decision system 240 or some other system, a resolution to the decisions presented by the content replacement markers. Once the content assets have been specified for each content replacement marker in the base linear stream of a particular personalized channel, the MDC 230 obtains the manifests for each content asset and each scheduled live event and advertisement that is to be presented on the personalized channel and assembles them into a personalized channel manifest that can be provided to ABR client device(s) requesting that personalized channel as a rolling manifest that can deliver a linear video stream.

Figure 8A:
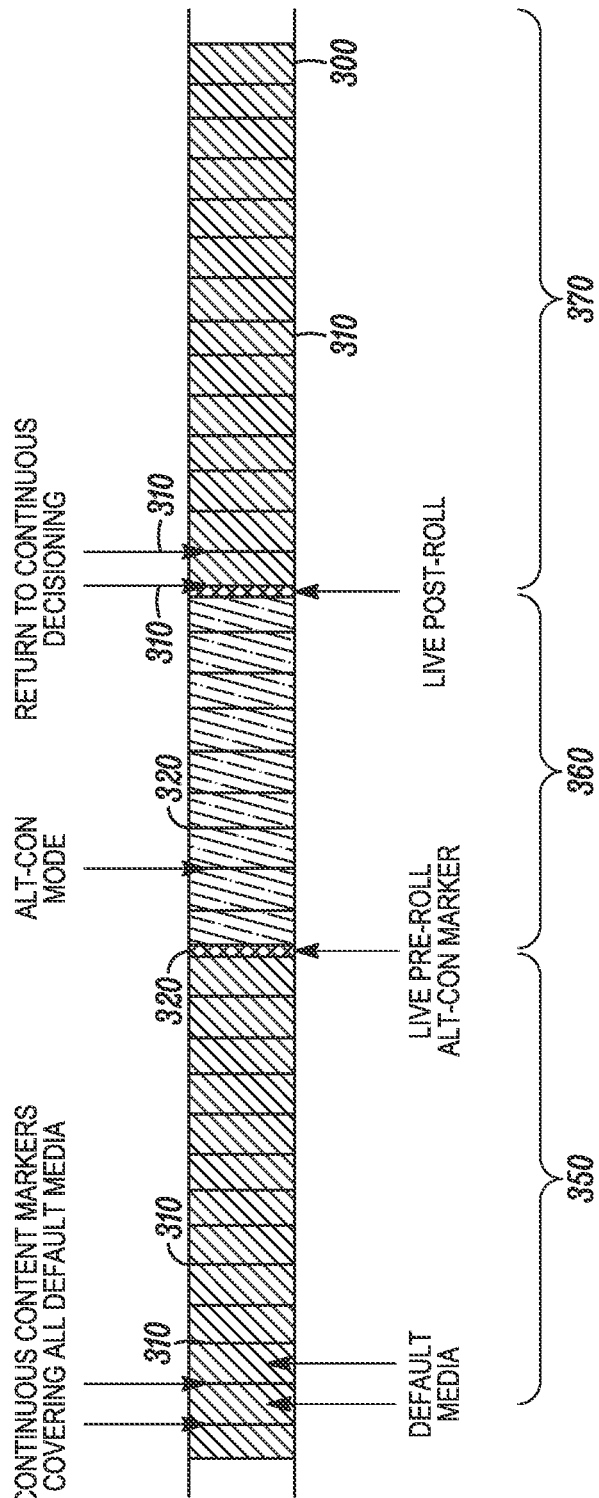
FIG. 8(a) shows a representation of an illustrative base linear stream that is paced out in accordance with the real-world clock time.

FIG. 8(a) shows a representation of an illustrative base linear stream 300 that is paced out in accordance with the real-world clock time, where time proceeds from left to right. As shown, the base linear stream 300 includes a continuous series of markers that represent one chunk of content That is, the time between adjacent markers corresponds to the duration of one chunk.

The in-band markers may be either content replacement markers 310 or alternative content markers 320. Each marker includes an annotation that specifies the decisioning engine that determines the content asset (e.g., a VOD asset, a live event) to be inserted at that time. The in-band signaling markers may be based on any suitable standard such as Society of Cable Telecommunications Engineers (SCTE) 35, for example. Alternatively, proprietary in-band signaling markers may be employed instead.

In the illustrative base linear stream 300 of FIG. 8(a), a first portion 350 of finite duration spanning multiple segments contains a continuous sequence of content replacement markers 310. Since the content replacement markers 310 each have a duration of one segment and are spaced one segment apart, they collectively ensure that the entire duration of the first portion 350 can be replaced with content assets that have not yet been specified without any gap in time. A second portion 360 of the base linear stream 300 begins and ends with alternative content markers 320, indicating that a live event is to be presented during this second portion 360. The first alternative content marker 320 may include an annotation specifying the location of the manifest for a previously provisioned pre-roll introduction to the live event and an annotation specifying the location of the manifest for the live event itself. A similar alternative content marker 320 that includes a previously provisioned post-roll out of the live event denotes the end of the second portion 360 of the base linear stream. The process of generating a manifest for a live base linear stream may continue in this manner so that the personalized channel can be presented as a linear channel. For instance, in FIG. 8(a), after conclusion of the live event, the live base linear stream presents another continuous sequence of content replacement markers 310 during a third portion 370 in which replacement content may be inserted without a gap in time. The entire process may continue endlessly or for a finite period of time (e.g., 8 hours a day) so that the personalized channel are available in the same way that conventional channels are available. That is, in some cases the ABR stream delivered on the personalized channel may be a never-ending ABR video stream unless and until an external event causes termination of the ABR video stream.

Figure 8B:
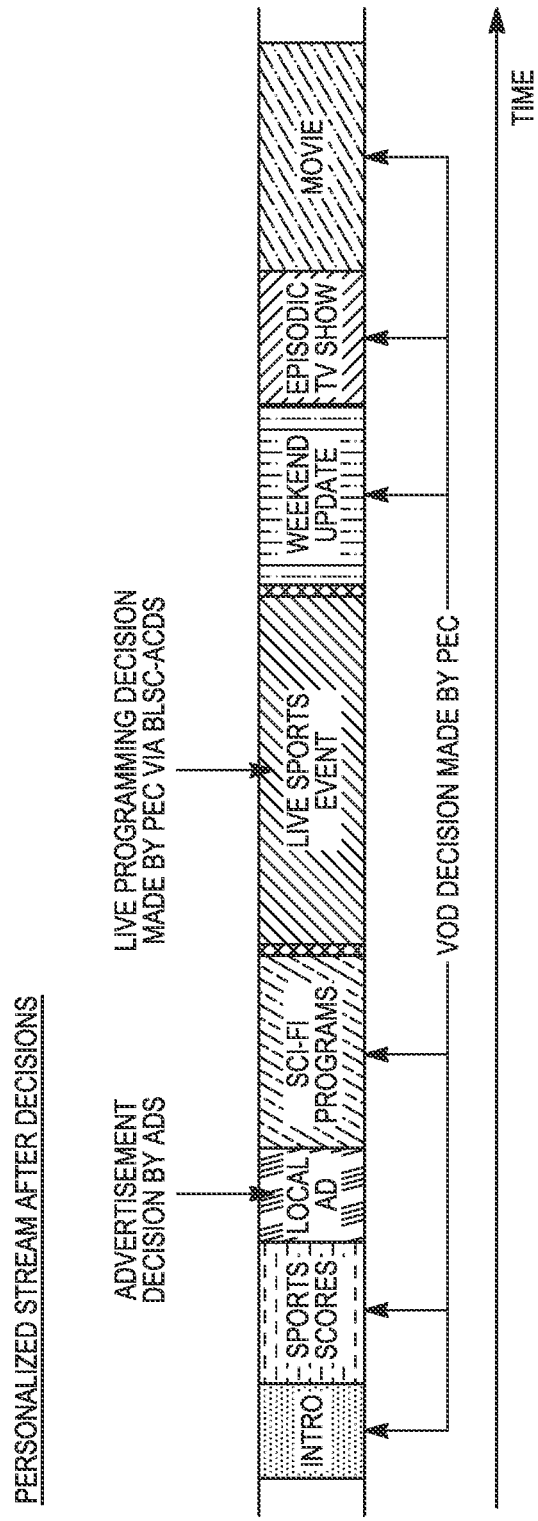
FIG. 8(b) shows one example of a personalized linear stream after the manifest delivery controller has resolved the decisions required by the content replacement markers.

FIG. 8(b) shows one example of a personalized linear stream after the MDC 230 has resolved the decisions required by the content replacement markers. As shown, the linear stream includes VOD assets such as sports scores, a sci-fi program, a movie, and so on, as well as a pre-scheduled live event and a local advertisement tailored to the particular market region to which the personalized linear stream is being delivered. If, for instance, this particular personalized channel has been established for one particular subscriber, then the content assets and live events have been preselected by the subscriber or have otherwise been determined to be of interest to the subscriber.

Returning to FIG. 2, the flow of communications between the various components and systems shown therein that are used to deliver a personalized channel to the client device 102 will now be described. As indicated at 1, the PEC 210 provides the BLSC 220, via suitable APIs exposed by the BLSC 220, with basic information to define the structure of the base linear stream for the particular personalized channel being developed. For example, the PEC 210 will provide a base URL for specifying the network location of the source (s) from which manifest URLs may be obtained, a schedule of live events and advertisements that are to be inserted into the video stream, and so on. Given this information from the PEC 220, the BLMS 220 in the BLSC 220 is able to create the manifest for the base linear stream.

At 2 the ABR client device 102 requests the manifest for the personalized channel in order to begin playing the personalized channel. The MDC 230 in turn, requests the base linear stream manifest from the BLMS 222 at 3. In one embodiment, the requests may be sent using HTTP Get requests. As further indicated at 3, the BLSC 220 sends the base linear manifest with the various markers to the MDC 230. The MDC 230 continuously looks ahead through the base linear manifest for markers indicating when content such as upcoming VOD assets, live events or advertisements are scheduled for presentation. The MDC 230 obtains from the marker annotations the URLs for the sources that are to provide the URLs for VOD content assets, live events and advertisements.

For instance, the MDC 230 may determine from a content replacement marker in a base linear stream for a particular personalized channel that it is to obtain a resolution to a VOD asset decision from the PEC 210. Accordingly, at 4a the MDC 230 sends a request to the PEC 210 to get the URL for the VOD asset manifest for the VOD asset that is to be inserted into the video stream on the personalized channel. The PEC 210 selects the appropriate asset for the particular personalized channel, possibly in consultation with the live/linear programming schedules 212, the metadata 214, the recommendation system(s) 216 and/or the user profiles 218. The PEC 210 then returns the appropriate URL for the selected VOD asset. Likewise, at 4b, the MDC 230 may identify an advertisement marker in the manifest for the base linear stream and in response obtains a URL from the ad decision system 240 for the URL for an advertisement that is to be inserted at some particular time in the video stream. Finally, the MDC 230 may determine from an alternative content marker that an upcoming live event is scheduled at a certain time and requests and receives the URL for this live event from the BLSC 220 at 4c. In this case the BLSC 220 is acting as an alternative content decision service that provides the URL for the live event. Of course, in other implementations, the MDC 230 may be directed to a different alternative content decision service to get the URL for the live event.

Once the MDC 230 has obtained the URLs for the various assets and events, it sends an HTTP GET request or the like over, e.g., the CDN 125, to obtain their manifests at 5. The MDC 230 receives the manifests at 6 and assembles them into a rolling manifest that may be delivered as a rolling manifest to the requesting ABR client device(s) 102 at 7, thereby appearing to the ABR client device(s) 102 as a linear stream. The ABR client device(s) 102 is thus able to use the rolling manifest to obtain the media over the CDN 125 in a conventional manner at 8.

In some cases the PEC 210 may instruct the BLSC 220 to update the base linear stream so that the client devices receiving the personalized channel are presented with a particular live/linear event instead of the content asset currently being presented or soon to be presented on the personalized channel. The PEC may also be responsible for tracking the content that is scheduled for presentation on the personalized channels to ensure their availability. If, for instance, access to the content is to expire before the time it is scheduled for presentation (due, for example, due to the expiration of a limited rights period to the content), the PEC may trigger a request to record the content on a network digital video recorder (DVR) or the like so that it remains accessible for presentation on the personalized channel. Such a recording may also be triggered if the user indicates that they wish to keep the content for subsequent viewing after the content is no longer available. In any case, once the content is no longer to be made available to users the PEC 210 will take the content out of the decisioning flows to remove it from any of the personalized channels on which it may be scheduled. The PEC 210 may also trigger the presentation of a notice to user that the content is no longer available.

While in the example described above, the PEC 210 receives a request at 4a from the MDC 230 for the resolution to decision point in the ABR manifest, this request alternatively may be received from other systems and devices as well. For example, the request may be received directly from an application residing on a client device such as set top box or smartphone, or from a playout system such as a legacy TV network or satellite system.

Figure 9:
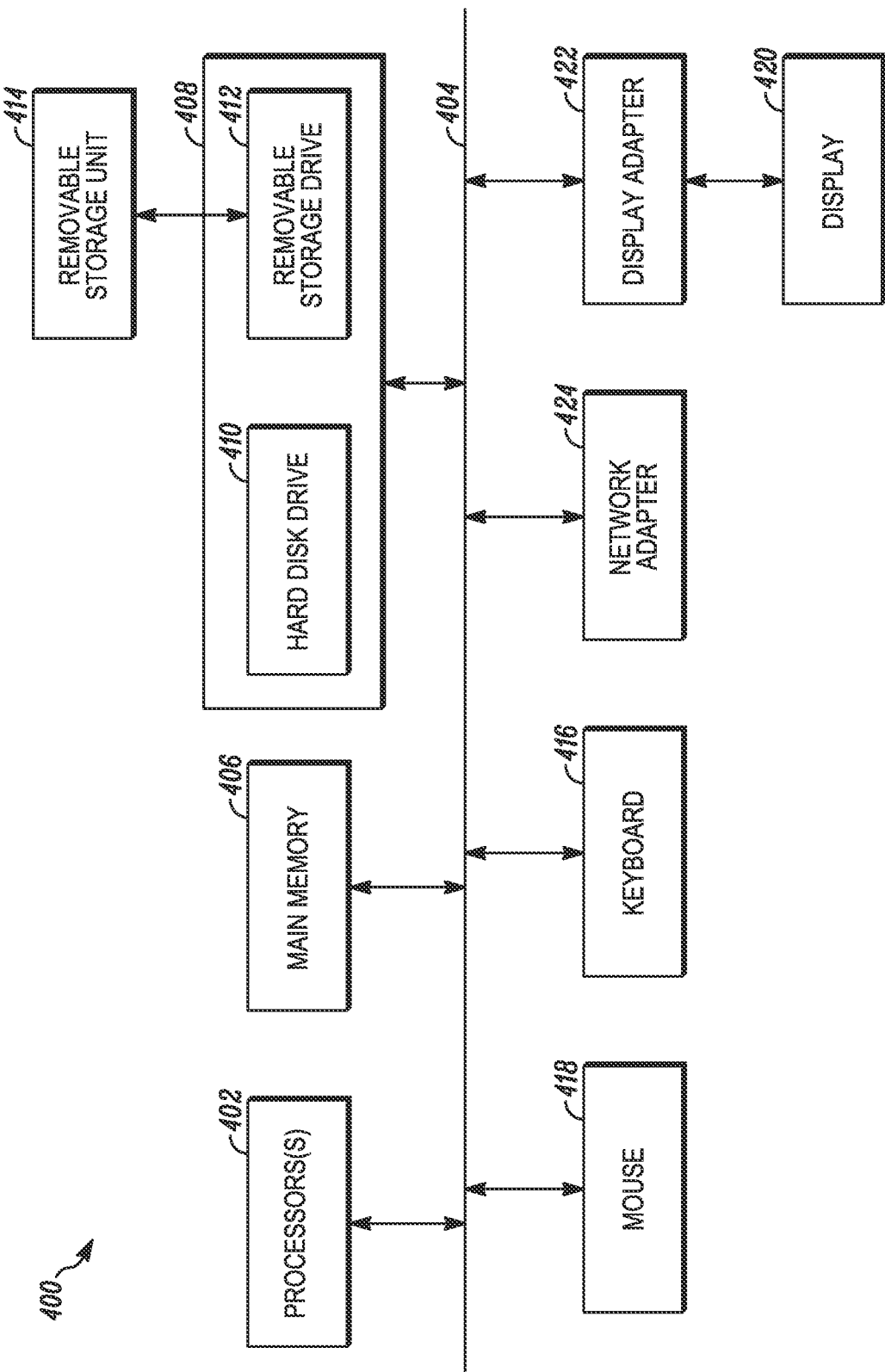
FIG. 9 illustrates a block diagram of one example of a computing apparatus that may be configured to implement or execute one or more of the processes performed by any of the various devices shown herein, including but not limited to the personalized experience controller (PEC) and the base liner stream controller (BLSC).

FIG. 9 illustrates a block diagram of one example of a computing apparatus 400 that may be configured to implement or execute one or more of the processes performed by any of the various devices shown herein, including but not limited to the PEC 210 and BLSC 220. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, where a copy of the program code for one or more of the processes depicted in FIGS. 2-5 may be stored. The removable storage drive 412 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between to or more computers. All functions performed by the various components, modules, engines, systems, apparatus, interfaces or the like may be collectively performed by a single processor or each component, module, engine, system, apparatus, interface or the like may have a separate processor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein may be combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method of providing content decisions for a personalized channel deliverable to a prescribed set of client devices as linear channel streaming adaptive bit rate (ABR) video content, the method comprising:
   (i) receiving a request for a content asset to be inserted in a linear video stream associated with an ABR manifest, and at a time specified in the ABR manifest, the linear video stream for presentation on the personalized channel; and
   (ii) responding to the request by selecting a particular content asset from among a pool of potential content assets including at least one Video-on-Demand (VOD) title, and providing a network location for accessing the particular content asset to be inserted in the linear video stream at the time specified, where the time specified in the ABR manifest is specified prior to a time a client device plays back any portion the selected said asset.

2. The method of claim 1, further comprising repeating (i) and (ii) for additional requests for resolving additional decision points in the ABR manifest for the linear stream such that the additional requests resolve additional decision points sufficient to ensure that content assets are specified for insertion into the linear video stream over a continuous duration of time without gaps.

3. The method of claim 1, further comprising generating a structure for the personalized channel, the structure specifying at least one type of content to be included in the personalized channel.

4. The method of claim 3, wherein the structure further specifies when at least one advertisement is to be included in the personalized channel and further comprising specifying at least one ad targeting parameter to be used in selecting advertisements to be presented on the personalized channel.

5. The method of claim 3, wherein generating the structure for the personalized channel includes selecting the at least one type of content based at least in part on the prescribed set of client devices to which the personalized channel is deliverable.

6. The method of claim 1, wherein the prescribed set of client devices to which the personalized channel is to be deliverable is selected from the group consisting of client devices associated with a specific Multichannel Video Programming Distributor (MVPD), client devices associated with a specific geographic area, client devices associated with a specific demographic group, and a client device associated with a specific user.

7. The method of claim 1, further comprising ingesting linear programming schedules and metadata associated with video-on-demand (VOD) content assets and further comprising selecting the specified content asset using the ingested linear programming schedules and the metadata.

8. The method of claim 7, wherein selecting the specified content asset further comprises identifying a match between content specified in the linear programming guide or by the metadata and information in a user profile from which user content preferences can be determined.

9. The method of claim 1, wherein the specified content asset is specified by a user of one of the client devices in the prescribed set of client devices.

10. The method of claim 1, further comprising causing the ABR manifest to be updated so that a live or linear event is presented instead of the specified content asset.

11. The method of claim 8, further comprising selecting the specified content asset using information in a user profile from which user content preferences can be determined and a content recommendation system that recommends content based at least in part on the user profile.

12. The method of claim 1, further comprising communicating with a content recommendation system to obtain a recommendation for a content asset to fill an empty time slot in a schedule of the personalized channel.

13. The method of claim 1, further comprising receiving a user request for the specified content asset to be inserted in the linear video stream at the specified time.

14. The method of claim 13, wherein the user request further includes a request for receiving updates to the specified content asset at regularly scheduled times.

15. The method of claim 1, further comprising causing the linear video stream to switch from a content asset currently being presented on the personalized channel to a specified live or linear event.

16. The method of claim 1, further comprising removing a given content asset from a schedule of content assets to be presented on the personalized channel upon expiration of a validity period for accessing the given content asset.

17. The method of claim 16, further comprising recording the given content asset on a digital video recorder so that the given content assert remains accessible for presentation on the personalized channel.

18. The method of claim 1, wherein receiving the request for a resolution to a decision point in the ABR manifest is received from a video manifest manipulator.

19. The method of claim 1, wherein receiving the request for a resolution to a decision point in the ABR manifest is received from an application residing on one of the client devices.

20. An apparatus comprising:
   at least one processor;
   at least one memory operatively coupled to the at least one processor;
   computer program code embodied on a non-transitory computer-readable storage medium, said computer program code, when loaded into said memory, causes said at least one processor to:
   (i) receive a request for a content asset associated with an ANR manifest, and to be inserted in a linear video stream at a time specified in the ABR manifest, the content asset comprising a plurality of sequential frames of video, the linear video stream being presented on the personalized channel; and
   (ii) respond to the request by selecting a particular content asset from among a pool of potential content assets including at least one Video-on-Demand (VOD) title, and providing a network location for accessing the particular content asset to be inserted in the linear video stream at the time specified, where the time specified is prior to a time a client device plays back any portion of the selected said asset.

* * * * *